United States Patent [19]
Clark et al.

[11] Patent Number: 6,125,393
[45] Date of Patent: *Sep. 26, 2000

[54] SYSTEM OF COMPRESSING THE TAIL OF A SPARSE LOG STREAM OF A MULTISYSTEM ENVIRONMENT

[75] Inventors: Carl Edward Clark, Poughkeepsie; Steven Jay Greenspan, Hyde Park, both of N.Y.; Jeffrey Douglas Haggar, Holly Springs, N.C.; Danny Ray Sutherland, Poughkeepsie, N.Y.

[73] Assignee: International Business Machines Corporation, Armonk, N.Y.

[ * ] Notice: This patent is subject to a terminal disclaimer.

[21] Appl. No.: 08/827,559

[22] Filed: Mar. 28, 1997

[51] Int. Cl.⁷ .............................. G06F 12/00; G06F 15/16
[52] U.S. Cl. ........................ 709/224; 709/231; 707/161; 707/202; 707/206
[58] Field of Search ........................ 379/106.01, 106.03, 379/106.02, 106.06; 340/853.2; 702/187; 709/224, 231; 711/112, 114; 707/206, 202, 101

[56] References Cited

U.S. PATENT DOCUMENTS

| | | | |
|---|---|---|---|
| 4,758,956 | 7/1988 | Duffy | 702/199 |
| 4,878,167 | 10/1989 | Kapulka et al. | 364/200 |
| 5,090,014 | 2/1992 | Polich et al. | 371/15.1 |
| 5,121,475 | 6/1992 | Child et al. | 395/153 |
| 5,155,678 | 10/1992 | Fukumoto et al. | 395/425 |
| 5,191,651 | 3/1993 | Halim et al. | 395/200 |
| 5,280,611 | 1/1994 | Mohan et al. | 395/600 |
| 5,339,427 | 8/1994 | Elko et al. | 395/725 |
| 5,345,590 | 9/1994 | Ault et al. | 395/650 |
| 5,394,554 | 2/1995 | Elko et al. | 395/800 |
| 5,410,695 | 4/1995 | Frey et al. | 395/650 |
| 5,463,736 | 10/1995 | Elko et al. | 395/848 |
| 5,469,463 | 11/1995 | Polich et al. | 395/182.18 |
| 5,471,631 | 11/1995 | Beardsley et al. | 395/650 |
| 5,481,689 | 1/1996 | Stamm et al. | 395/412 |
| 5,493,668 | 2/1996 | Elko et al. | 395/457 |
| 5,530,850 | 6/1996 | Ford et al. | 707/206 |
| 5,537,574 | 7/1996 | Elko et al. | 395/468 |
| 5,537,588 | 7/1996 | Englemann et al. | 711/114 |
| 5,551,003 | 8/1996 | Mattson et al. | 711/112 |
| 5,737,600 | 4/1998 | Geiner et al. | 707/200 |
| 5,745,693 | 4/1998 | Knight et al. | 395/200.54 |
| 5,765,171 | 6/1998 | Gehani et al. | 707/202 |
| 5,805,821 | 9/1998 | Saxena et al. | 395/200.61 |
| 5,812,792 | 9/1998 | Haddock et al. | 395/200.61 |
| 5,832,515 | 11/1998 | Ledain et al. | 707/206 |
| 5,999,358 | 12/1999 | Clark et al. | 707/202 |

OTHER PUBLICATIONS

Whitaker et al., "Design of the Server for the Spiralog File System", Digital Technical Journal, pp. 1–25, Oct. 1996.

"MVS Programming Assembler Services Reference", IBM Publication No. GC28–1910–01, Sep. 1996.

"MVS Programming Assembler Services Guide", IBM Publication No. GC28–1762–01, Sep. 1996.

"LRAID: Use of Log Disks for an Efficient RAID Design," IBM Technical Disclosure Bulletin, vol. 27, No. 02A, pp. 19–20 (Feb. 1994).

Primary Examiner—Le Hien Luu
Assistant Examiner—Almari Romero
Attorney, Agent, or Firm—Lily Neff, Esq.; Heslin & Rothenberg, P.C.

[57] ABSTRACT

A multisystem log stream of a multisystem environment is compressed. The oldest record needed for each system that can write or delete entries from the multisystem log stream is tracked, and that information is used in compression of the log stream. The block ids associated with those oldest records are maintained within a vector, and when the vector is updated, a determination is made as to whether the entry in the vector that it replaced previously contained the lowest block id in the vector. If so, all the records having block ids lower than the new lowest block id in the vector are deleted.

13 Claims, 11 Drawing Sheets

SYSTEM OF COMPRESSING THE TAIL OF A SPARSE LOG STREAM OF A MULTISYSTEM ENVIRONMENT

CROSS REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Tail Compression Of A Sparse Log Stream Of A Computer System," by Clark et al., Ser. No. 08/827,292, now U.S. Pat. No. 5,920,875;

"Tail Compression Of A Log Stream Using A Scratch Pad Of Logically Deleted Entries," by Clark et al., Ser. No. 08/827,560, now U.S. Pat. No. 5,966,708;

"System Of Compressing A Log Stream Using A Scratch Pad Of Logically Deleted Entries," by Clark et al., Ser. No. 08/828,465, (Docket No. PO9-97-025);

"A Method of One System Of A Multisystem Environment Taking Over Log Entries Owned By Another System," by Clark et al., Ser. No. 08/827,205, (Docket No. PO9-96-098);

"One System Of A Multisystem Environment Taking Over Log Entries Owned By Another System," by Clark et al., Ser. No. 08/827,293, (Docket No. PO9-97-026);

"Tail Compression Of a Sparse Log Stream Of A Multisystem Environment," by Clark et al., Ser. No. 08/827,214, (Docket No. PO9-97-018); and "System Of Compressing The Tail Of A Sparse Log Stream Of A Computer System," by Clark et al., Ser. No. 08/827,558, now U.S. Pat. No. 5,956,735.

TECHNICAL FIELD

This invention relates, in general, to the management of a log stream and, in particular, to compression of a multisystem log stream, when the log stream has a determined amount of reusable space.

BACKGROUND ART

In various computer systems, historical log data is maintained (for example, in log files) for use in system recovery, problem determination and/or system maintenance. Typically, these log files have a limited amount of capacity to retain the historical data. After the capacity is met, at least some of the data records are moved from the log files to external storage devices, such as direct access storage devices (DASD), thereby providing additional space in the log file for more data.

At some point, data within the log file and/or on the external storage devices is no longer needed. For example, there is no need to keep the data once it passes its retention requirements. The saving of data past its usefulness adversely affects system performance in a number of ways. For example, when unnecessary data is retained and the log file needs to be browsed to recover logged data during recovery of a failure, the browser may have to deal with potentially large amounts of unnecessary data, thereby slowing down the recovery process. Additionally, when the saving of unwanted data records requires the use of external storage devices, which typically provide slower access to the data, the reading of the data takes longer, thus, affecting system performance.

Therefore, it is beneficial to delete any unnecessary data from the log files. However, generally, there are a number of restrictions placed on what data can be deleted. In one example, data may only be deleted from the tail of the log file. Thus, if the data record at the tail is still necessary, then no data can be deleted from the log file. This forces the saving of many unnecessary or unwanted data records.

The above problem is exacerbated when a log file is shared by multiple systems and the data record at the tail is owned by a system that has failed. In that case, the data record may not be deleted for a very long time, if at all, causing the saving of an increasing number of unwanted data records.

Thus, a need exists for a technique that allows the removal of unnecessary data records from a log file, even when the data record at the tail is still wanted. A further need exists for a tail compression technique that is applicable to multisystem log streams.

SUMMARY OF THE INVENTION

The shortcomings of the prior art are overcome and additional advantages are provided through the provision of a system of compressing a multisystem log stream of a multisystem environment. In one example, the system includes means for determining for a first system of the multisystem environment a first position within the multisystem log stream from which one or more entries of the multisystem log stream can be deleted; means for determining for a second system of the multisystem environment a second position within the multisystem log stream from which one or more entries of the multisystem log stream can be deleted; means for selecting from the first position and the second position a deletion position within the multisystem log stream; and means for using the deletion position to remove one or more entries from the multisystem log stream.

In one example, the first position includes a first block id, which represents the oldest entry within the multisystem log stream that is wanted for the first system. Further, the second position includes a second block id, which represents the oldest entry within the multisystem log stream that is wanted for the second system.

In a further example, the means for selecting includes means for comparing the first block id and the second block id to determine therefrom the oldest entry to be kept within the multisystem log stream. The oldest entry corresponds to the deletion position.

In yet a further example, the means for using includes means for removing the one or more entries older than the deletion position.

The log compression capability of the present invention advantageously provides for the removal of unnecessary data records from a multisystem log stream, even when one or more entries at or near the tail of the log stream is still wanted. The invention provides for the rewriting of one or more entries at or near the tail to one or more other locations within the log stream or to another log stream, so that unnecessary entries can be deleted and the log stream can be compressed.

In accordance with the principles of the present invention, the oldest record needed for each system coupled to the multisystem log stream is tracked and this information is used in compressing the log stream.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a multisystem log stream compression capability is provided in which the oldest record needed for each system coupled to the multisystem log stream is tracked and that information is used in compression of the log stream. Additionally, entries of the log stream that are still wanted or needed (i.e., active) are rewritten from one end of a multisystem log stream to another end of the log stream (or to another log stream), such that other unnecessary entries can be deleted and the log stream can be compressed.

Figure 1:
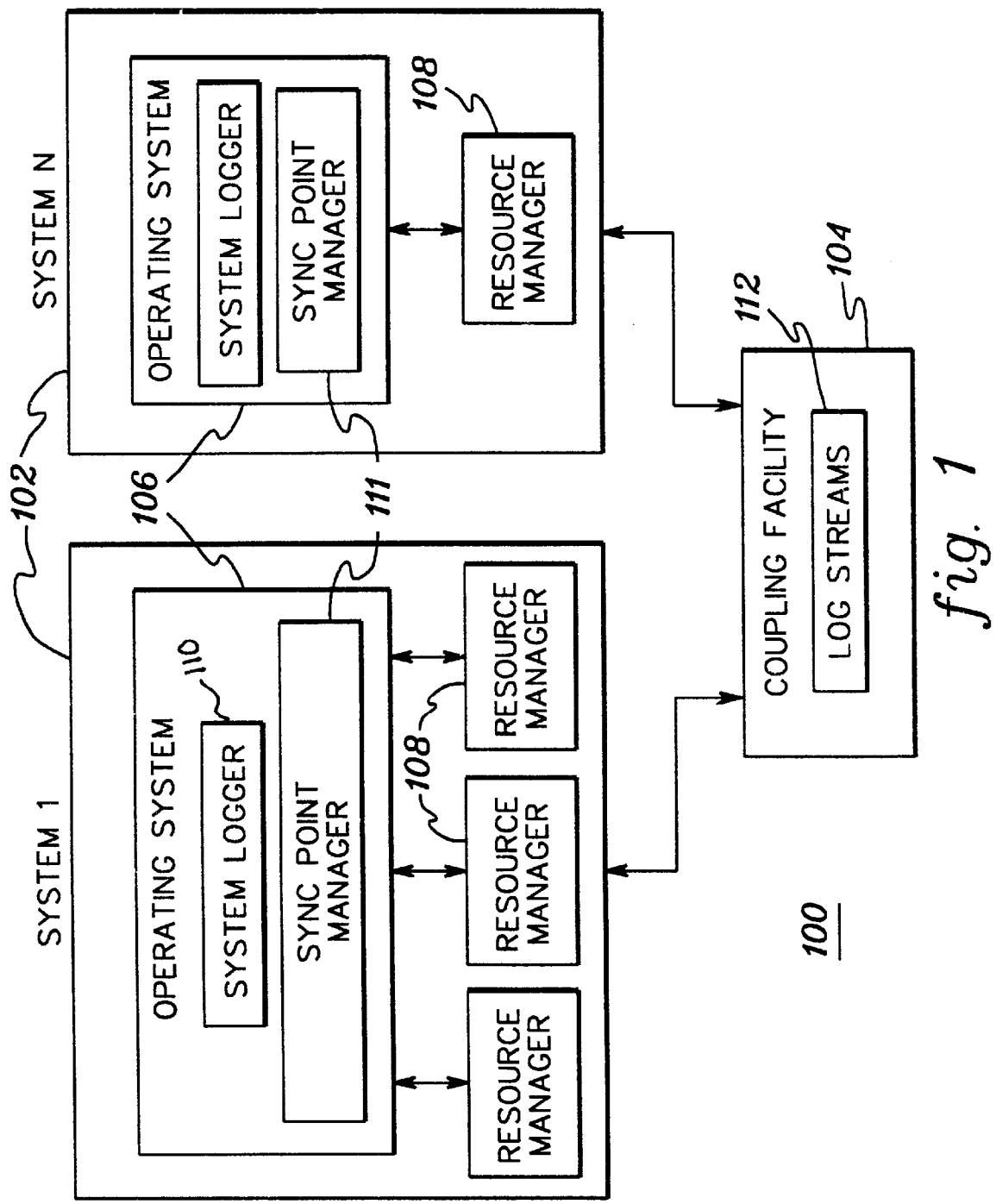
FIG. 1 depicts one example of a multisystem environment incorporating and using the log stream compression capability of the present invention.

One example of a multisystem environment incorporating and using the log stream compression capability of the present invention is depicted in FIG. 1 and described in detail herein. In one example, computer system 100 is based on the Enterprise Systems Architecture (ESA)/390 offered by International Business Machines Corporation, and includes one or more systems 102 coupled to a coupling facility 104. Each system 102 includes an operating system 106 and one or more resource managers 108, each of which is described below.

In one embodiment, operating system 106 is, for instance, the Multiple Virtual Storage (MVS) operating system offered by International Business Machines Corporation (or the OS/390 operating system offered by International Business Machines Corporation). Operating system 106 includes, for instance, a system logger component 110 and a sync point manager 111, each of which is described below.

In one example, system logger 110 runs in its own address space started by the operating system. The system logger is used for the log stream compression capability of the present invention, as described below, and one embodiment of a system logger is described in MVS Programming Assembler Services Reference, IBM Publication No. GC28-1910-01 (September 1996; and MVS Programming Assembler Services Guide, IBM Publication No. GC28-1762-01 (September 1996), each of which is hereby incorporated herein by reference in its entirety.

Sync point manager 111 coordinates participants (such as resource managers) in a 2-phase commit protocol. One example of a sync point manager is a Resource Recovery Service, which may be offered by International Business Machines Corporation. The sync point manager is also involved in the compression technique of the present invention, as described below.

Each of resource managers 108 owns and controls a set of resources within the computer system. For example, a resource manager can be a database management facility, such as IMS or DB2, each of which is offered by International Business Machines Corporation.

As mentioned above, each system 102 is coupled to coupling facility 104. Coupling facility 104 is a shareable facility that contains storage accessible by the systems and performs operations requested by the resource managers and/or programs running within the systems. In one embodiment, coupling facility 104 is a structured-external storage processor (SES). Examples of a coupling facility are described in detail in U.S. Pat. No. 5,317,739, entitled "Method and Apparatus for Coupling Data Processing Systems," by Elko et al., issued May 31, 1994, and in U.S. patent application Ser. No. 08/632,683 entitled, "Method And System For Log Management In A Coupled Data Processing System," by Geiner et al., filed on Apr. 15, 1996, both assigned to International Business Machines Corporation, and each of which is hereby incorporated herein by reference in its entirety.

In accordance with the principles of the present invention, coupling facility 104 includes a plurality of log streams 112, which are accessible by one or more of the plurality of systems of the multisystem environment. In particular, one or more of the sync point managers uses the log streams during the log compression capability of the present invention, as described in detail below.

In one embodiment, at least a portion of one or more of the log streams can be stored in one or more storage devices (e.g., direct access storage devices (DASD)), when, for example, sufficient space for the log stream(s) no longer exists within the coupling facility.

One example of a log stream and various services corresponding to the log stream are described in detail in U.S. patent application Ser. No. 08/632,683 entitled, "Method And System For Log Management In A Coupled Data Processing System," by Geiner et al., filed on Apr. 15, 1996, which is hereby incorporated herein by reference in its entirety.

Figure 2:
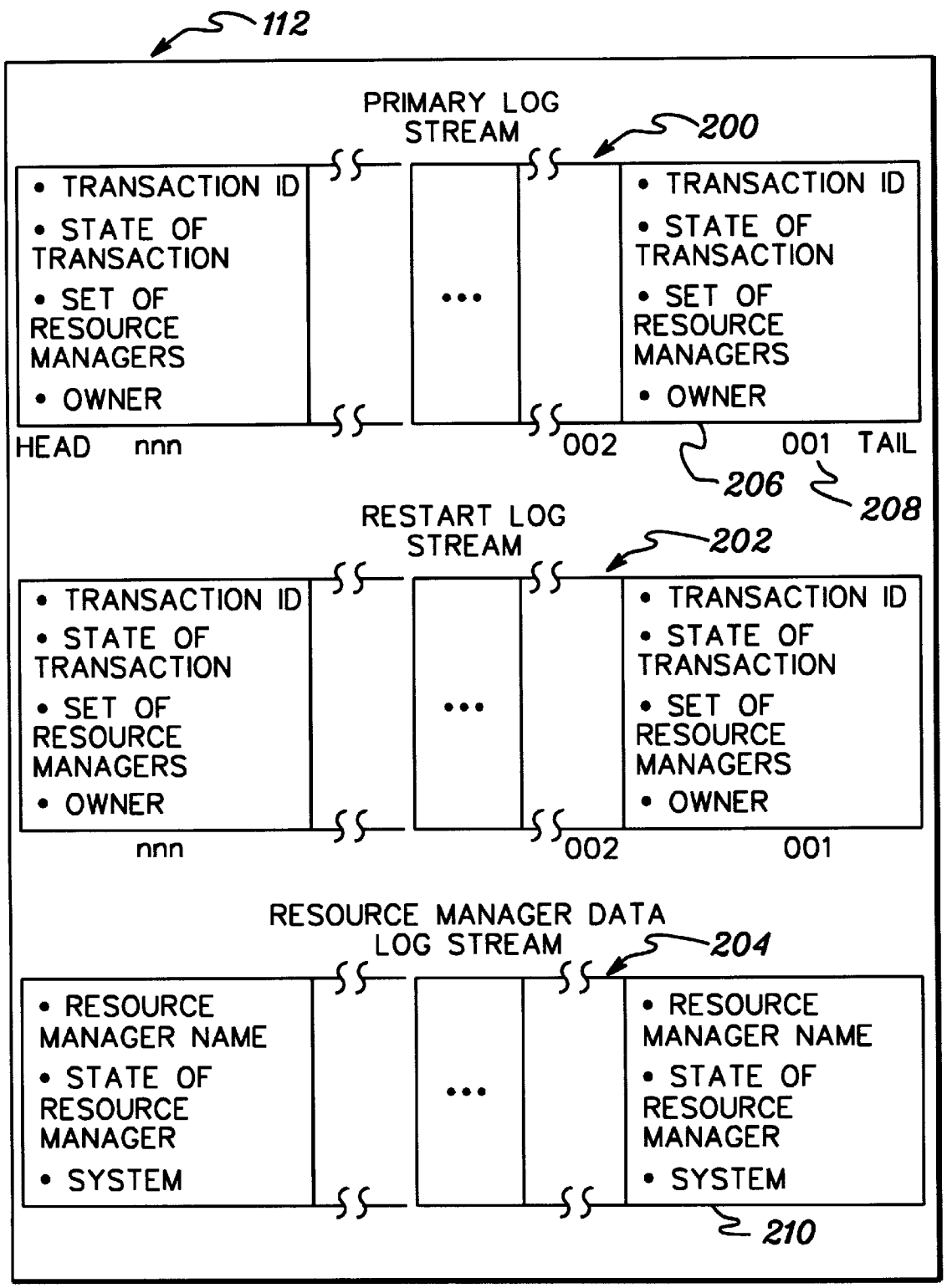
FIG. 2 depicts examples of a primary log stream, a restart log stream and a resource manager data log stream, respectively, of the multisystem environment of FIG. 1, in accordance with the principles of the present invention.

One example of the components of log streams 112, used for the present invention, are described in detail with reference to FIG. 2. In one embodiment, log streams 112 include three log streams: a primary log stream 200, a restart log stream 202, and a resource manager data log stream 204, each of which is described in detail below.

In one example, primary log stream 200 includes information about the transactions processing on the systems, as well as the resource managers involved in those transactions. The information is written to the primary log stream by, for instance, the system loggers upon direction from the sync point managers. In one embodiment, primary log stream 200 includes a number of log blocks or log entries 206, each including various data, such as a transaction identifier, the state of the transaction (e.g., committed, back-out), the set of resource managers associated with the transaction identified by the transaction id, and the name of the system that owns the entry (i.e., the system that wrote the data to the primary log stream). Each log entry has a block id 208, which represents, for instance, a relative offset into the log stream. In one example, the smaller the block id, the older the data.

One end of the primary log stream is referred to herein as the tail or rear of the log stream. In one embodiment, the rear of the log stream typically includes the oldest entry of the log stream (i.e., the entry with the oldest block id). The other end of the log stream is referred to herein as the head, which is forward from the tail or rear. (In another embodiment, it may be the head instead of the tail, which typically holds the oldest entry. The present invention equally applies to such a log stream.)

Restart log stream 202 represents, for instance, the transactions that are eligible to be completed on another system. In one example, the entries within restart log stream 202 have a similar format as the entries of primary log stream 200. In particular, each entry also includes the transaction identifier, the state of the transaction, and the set of resource managers; however, the name of the system that owns the entry is set to null. The log entries of the restart log stream are not owned by any system.

Resource manager data log stream 204 keeps track of all the resource managers that are using the sync point managers for coordination. In one example, it includes a plurality of entries 210 and each entry includes the state of a resource manager involved with a sync point manager and the system on which the resource manager is to run.

Each of the log streams described above may have additional data, which need not be described for the present invention. Further, in another embodiment of the invention, the log streams are not included in a coupling facility, but are instead stored in shared storage, such as, for instance, shared external storage devices (e.g., DASD).

Figure 3:
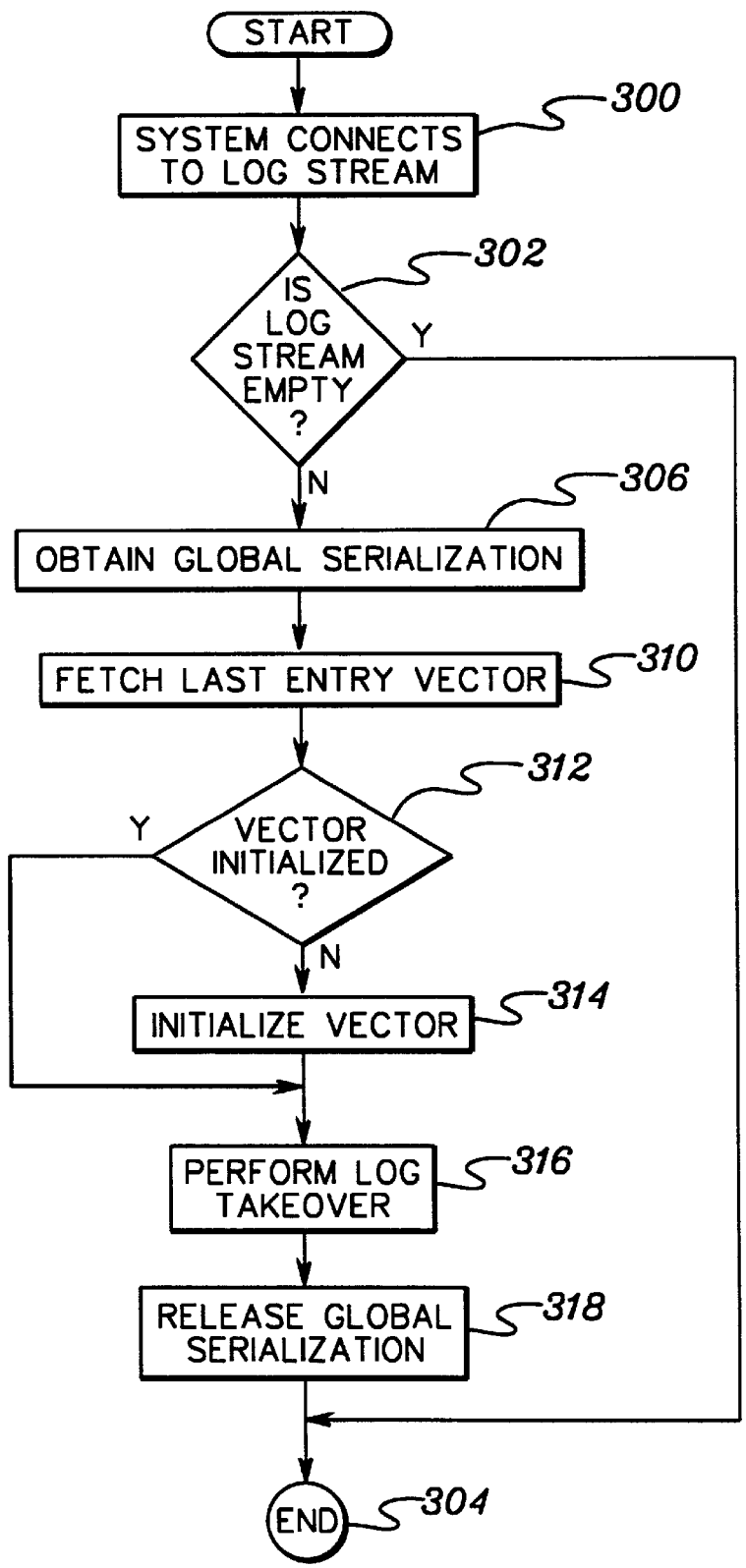
FIG. 3 depicts one embodiment of the logic used when a system connects to the primary log stream of FIG. 2, in accordance with the principles of the present invention.

In one embodiment, before a system can write data to a log stream, such as the primary log stream, the system connects to the log stream. In accordance with the principles of the present invention, when a system connects to the log stream, it performs certain functions, as described below with reference to FIG. 3.

When a system, such as System X, first connects to the log stream, STEP 300, it reads the primary log stream to determine if there are any records on the log stream, INQUIRY 302. When the log stream is empty, then no other functions need to be performed, STEP 304. If, however, there are entries on the log stream, then additional actions are taken, as described below.

In one example, the connecting system (e.g., System X) obtains an environment-wide enqueue (for example, in MVS/ESA it is SCOPE(SYSTEMS)ENQ), STEP 306, which allows System X, and no other system while the enqueue is held, to perform certain tasks.

Figure 5A:
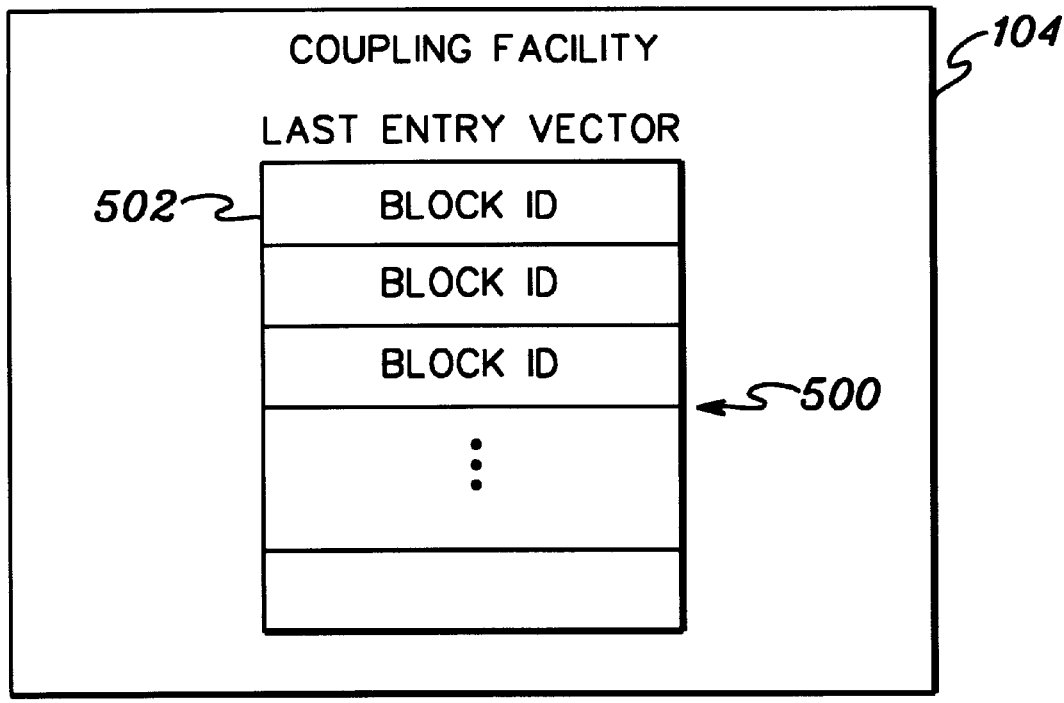
FIGS. 5a and 5b depict examples of a last entry vector updated during the compression technique of the present invention, in accordance with the principles of the present invention.

Subsequent to obtaining global serialization, a last entry vector is fetched, STEP 310. One embodiment of a last entry vector 500 is described in detail with reference to FIG. 5a. In one example, last entry vector 500 includes an entry 502 for each system that could potentially participate in writing entries to the primary log stream. For instance, if the multisystem includes three systems, System X, System Y and System Z, that could write to the primary log stream, then there would be three entries in the vector. Each entry includes the block id of the oldest log entry (e.g., the smallest block id) in the primary log stream needed by the respective system.

In one embodiment, the last entry vector is created within coupling facility 104 using, for example, a set of services provided by system logger 110. In other embodiments, the last entry vector is maintained on a shared external storage device (e.g., DASD) or copies of the vector are maintained in main storage, a cache, or auxiliary storage of each system. Other examples are also possible and included within the spirit and scope of the present invention.

After the vector is fetched, a determination is made as to whether the vector is initialized, INQUIRY 312. If the vector is uninitialized, for one reason or another (the vector is potentially volatile), the vector is initialized, as described below, STEP 314.

For example, System X initializes the vector by placing the block id of the oldest log entry System X still needs in the vector entry corresponding to System X. For example, if entry 1 of vector 500 corresponds to System X and the oldest block id System X still needs is 004, block id 004 is placed in vector entry 1 (see FIG. 5b).

In addition to the above, System X places the lowest possible block id (e.g., block id 001) in the vector entries corresponding to any systems connected to the log stream. For example, if System Z is connected to the log stream and vector entry 3 corresponds to System Z, block id 001 is placed in vector entry 3 (see FIG. 5b).

Figure 5B:
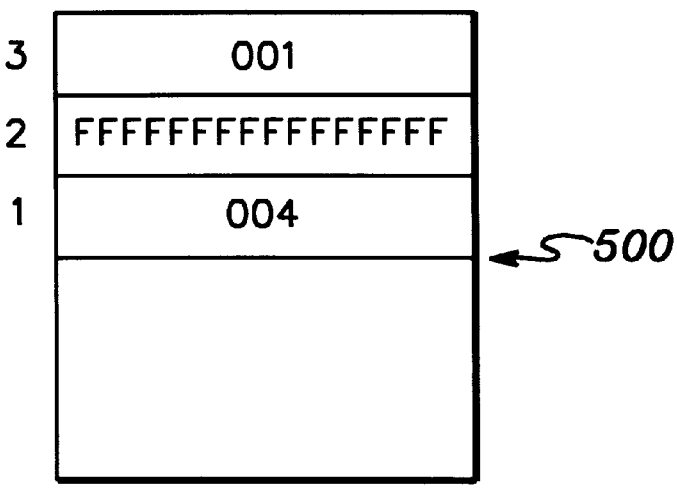

Further, System X places the highest possible block id (e.g., x'FFFFFFFFFFFFFFFF') in any vector entry corresponding to a disconnected system, such as System Y (see FIG. 5b).

The above initialization procedure is also performed whenever a system attempts to update the last entry vector and finds the vector uninitialized.

Returning to FIG. 3, subsequent to performing the vector initialization or, if the vector is already initialized, System X (as one example) performs log takeover management of any entries on the primary log stream belonging to inactive systems (e.g., systems not connected to the log stream), STEP 316.

One embodiment of a log takeover procedure is described in detail in U.S. patent application Ser. No. 08/827,205, entitled "A METHOD OF ONE SYSTEM OF A MULTI-SYSTEM ENVIRONMENT TAKING OVER LOG ENTRIES OWNED BY ANOTHER SYSTEM," Clark et al., (Docket No. PO9-96-098), filed on the same day herewith and assigned to the same assignee as this application; as well as in U.S. patent application Ser. No. 08/827,293, entitled "ONE SYSTEM OF A MULTISYSTEM ENVIRONMENT TAKING OVER LOG ENTRIES OWNED BY ANOTHER SYSTEM," Clark et al., (Docket No. PO9-97-026), filed on the same day herewith and assigned to the same assignee as this application, each of which is hereby incorporated herein by reference in its entirety.

One example of log takeover is also described below with reference to FIG. 4. In the one example described herein, System X is taking over entries owned by System Y. However, the same procedure is followed by any system taking over entries for any other system.

Figure 4:
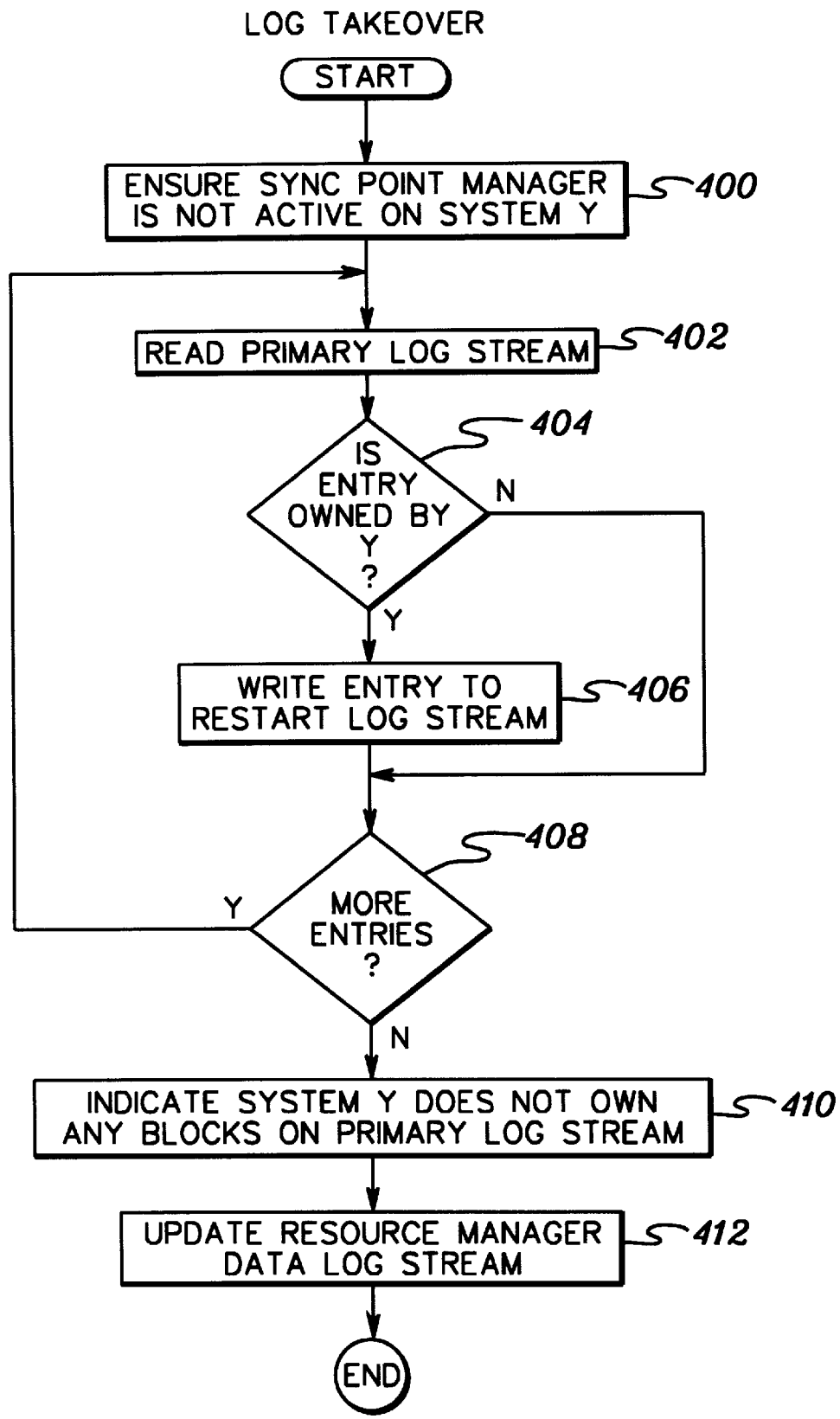
FIG. 4 depicts one example of the logic used by one system of the multisystem environment of FIG. 1 to take over log entries owned by another system, in accordance with the principles of the present invention.

Referring to FIG. 4, initially, the sync point manager of System X, Sync Point Manager X, ensures that the sync point manager of System Y is not active on System Y, STEP 400. In particular, in one embodiment, there is a set of enqueues, one for each sync point manager of the multisystem environment. Part of the enqueue is the system name for that sync point manager. Thus, in order to determine if the sync point manager of System Y is active, Sync Point Manager X checks the status of the enqueue pertaining to System Y. If the status indicates that Sync Point Manager Y is active, then takeover does not proceed. However, if the status indicates the sync point manager is inactive, then takeover proceeds, as follows.

An entry on the primary log stream is read, STEP 402, and if that entry is owned by System Y, INQUIRY 404, the entry is written to restart log stream 202, STEP 406. In particular, in one example, the entry is written to the restart log stream; however, it physically remains on the primary log stream until the primary log stream is compressed, in accordance with the principles of the present invention. Although the entry is not physically removed from the primary log stream, it is logically deleted, as described below.

Subsequent to writing the entry on the restart log stream, or if the entry is not owned by System Y, determination is made as to whether there are more entries on the primary log stream, STEP 408. If there are more entries on the log stream, then control flows back to STEP 402 "READ PRIMARY LOG STREAM." However, if there are no more entries on the primary log stream, then processing continues, as follows.

Subsequent to writing all the entries owned by System Y onto the restart log stream, an indication is made that System Y does not own any of the blocks (i.e., log entries) on the primary log stream, STEP 410. In one example, this indication is made by updating the last entry vector, as described herein.

In order to indicate that System Y, as one example, does not own any blocks on the primary log stream, the entry in vector 500 (FIGS. 5a and 5b) corresponding to System Y is set to a value that represents the highest possible block id (e.g., x'FFFFFFFFFFFFFFFF'). This logically deletes all the log entries in the primary log stream corresponding to System Y. The logical deletion allows the sync point manager on any system to free those blocks during, for example, a tail compression, as described below.

Returning to FIG. 4, subsequent to indicating that System Y does not own any blocks on the primary log stream, the resource manager data log stream is updated, STEP 412. In particular, each entry in the resource manager data log stream is read and for each resource manager that was required to restart on System Y, its ownership field is updated to reflect that it can start on any system.

This completes the takeover by System X of the entries owned by System Y. The same procedure is also performed, however, by System X for any other inactive systems.

Returning to FIG. 3, after log takeover is complete, global serialization is released, STEP 318, and processing of the steps associated with connecting to the log stream is complete, STEP 304.

Subsequent to performing the steps associated with connecting to the log stream, a system can write entries to the log stream. In one embodiment, data is written to a log stream, such as, for instance, primary log stream 200, by one or more system loggers under direction of one or more of the sync point managers. In particular, the sync point managers request that the data be written to the log stream for one or more of the resource managers.

One embodiment of adding entries to a log stream is described in detail in U.S. patent application Ser. No. 08/827,292, entitled "Tail Compression Of A Sparse Log Stream Of A Computer System," by Clark et al., (Docket No. PO9-97-019), and in U.S. patent application Ser. No. 08/827,558, now U.S. Pat. No. 5,956,735, entitled "System Of Compressing The Tail Of A Sparse Log Stream Of A Computer System," by Clark et al., both of which are filed on the same day as this application and assigned to the same assignee as this application, and each of which is hereby incorporated herein by reference in its entirety.

One example of adding entries to log stream 200 is also described in detail with reference to FIG. 6. In the one illustrative example described below, the sync point manager of a system (e.g., System X) requests data to be written by the system logger to primary log stream 200. This sync point manager is referred to herein as Sync Point Manager X. The same logic is used, however, by the other sync point managers (or any other components or entities) that wish to write information to the primary log stream.

Figure 6:
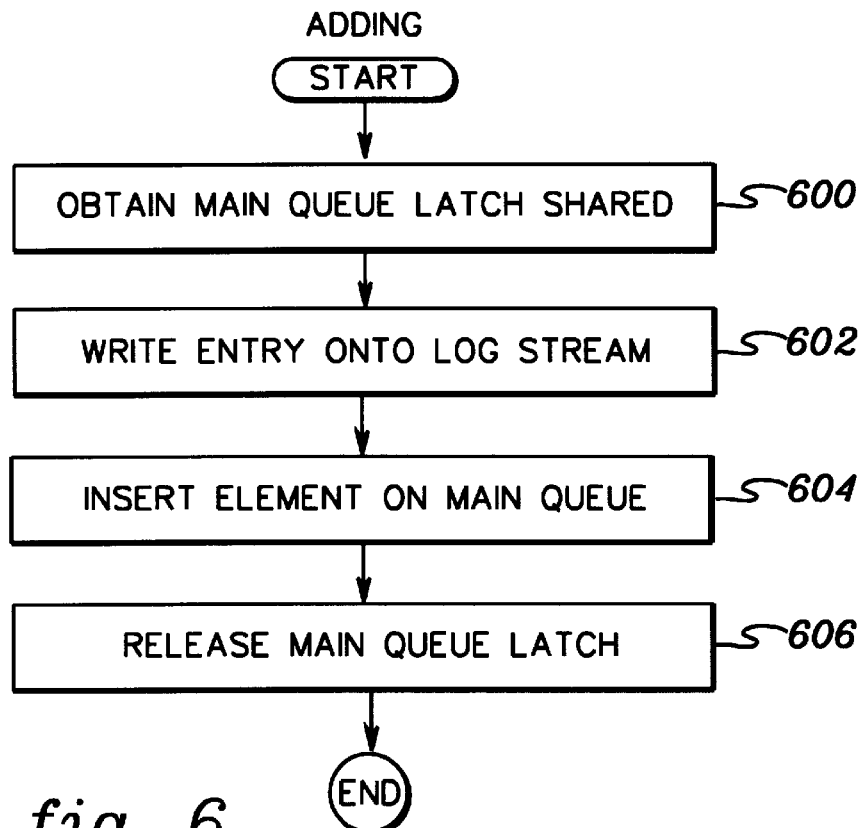
FIG. 6 depicts one embodiment of the logic used in adding new entries to the primary log stream of FIG. 2, in accordance with the principles of the present invention.
Figure 7:
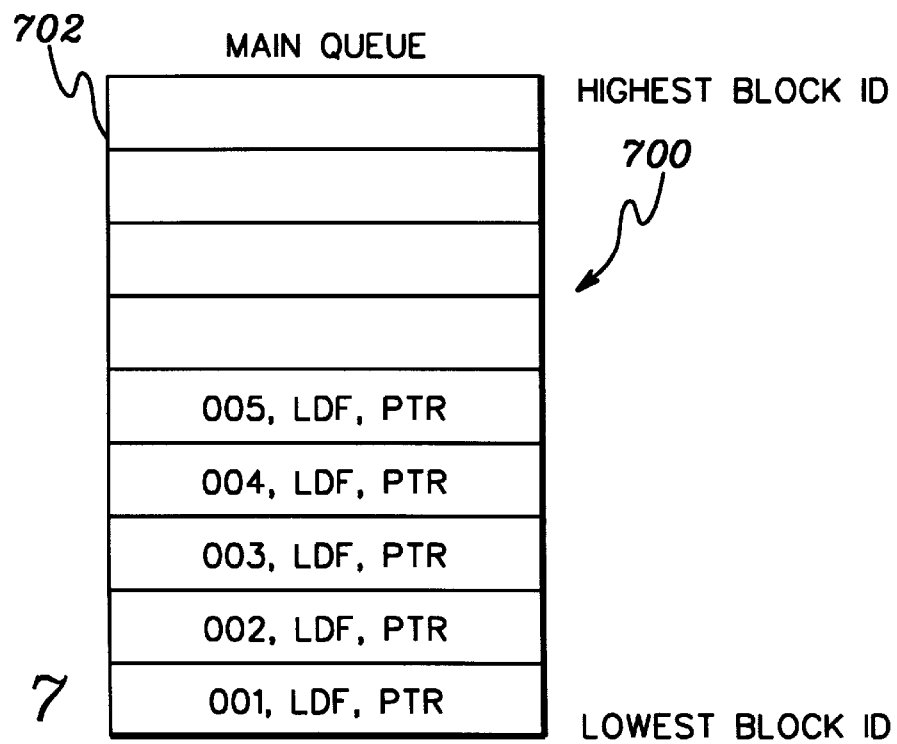
FIG. 7 depicts one embodiment of a main queue, used in accordance with the principles of the present invention.

Referring to FIG. 6, initially, a shared serialization resource (e.g., an MVS/ESA shared latch) is obtained for a main queue located within System X, STEP 600. The shared latch allows multiple entities, if any, to concurrently access the queue. The main queue is used herein to hold elements representative of entries within the primary log stream. One example of a main queue 700 is depicted in FIG. 7 and described below.

Main queue 700 is located, in one example, within the storage of System X. Each system that writes to the log stream has its own main queue. In one instance, main queue 700 includes one or more elements 702. Each element includes a representation of an entry written onto the primary log stream. For instance, each element includes the block id of the corresponding log stream entry, and a logical deletion flag (LDF), which is described below. In this example, the data for the entry is not maintained within the queue, but stored separately in, for instance, main store, a cache, auxiliary storage, external storage devices, a coupling facility or any combination thereof. Thus, each element also includes a pointer (PTR) to the corresponding data for the entry represented by the element.

Returning to FIG. 6, subsequent to obtaining the latch, a new entry is added to the log stream and given a block id, STEP 602. In one example, the entry is written to the head of the log stream, and system logger 110 ensures that the block id is greater than the block ids already assigned by any of the systems.

Thereafter, a new element, referred to as a LGB, is inserted onto main queue 700 of System X in order of the block id, STEP 604. In one example, the highest block id is at the top of the queue. In particular, the element is enqueued using compare and swap logic. This provides serialization for the queue, such that multiple updates to the queue are not occurring at the same time.

Subsequently, the latch is released, STEP 606, and the addition process by System X is complete.

When an entry on the primary log stream is no longer needed (e.g., its retention requirements have been met), then the entry is logically deleted. In particular, the entry physically remains on the log stream until the log stream is, for instance, compressed, but it is marked as logically deleted.

One embodiment of logically deleting entries is described in detail in U.S. patent application Ser. No. 08/827,292, entitled "Tail Compression Of A Sparse Log Stream Of A Computer System," by Clark et al., (Docket No. PO9-97-019), and in U.S. patent application Ser. No. 08/827,558, now U.S. Pat. No. 5,956,735, entitled "System Of Compressing The Tail Of A Sparse Log Stream Of A Computer System," by Clark et al., both of which are filed on the same day as this application and assigned to the same assignee of this application, and each of which is hereby incorporated herein by reference in its entirety.

One example of logically deleting an entry of the log stream is also described in detail below with reference to FIG. 8. In the one illustrative example described below, it is Sync Point Manager X that is logically deleting an entry from the primary log stream. The same logic is used, however, by the other sync point managers (or other components or entities) that wish to logically delete information from the primary log stream.

Figure 8:
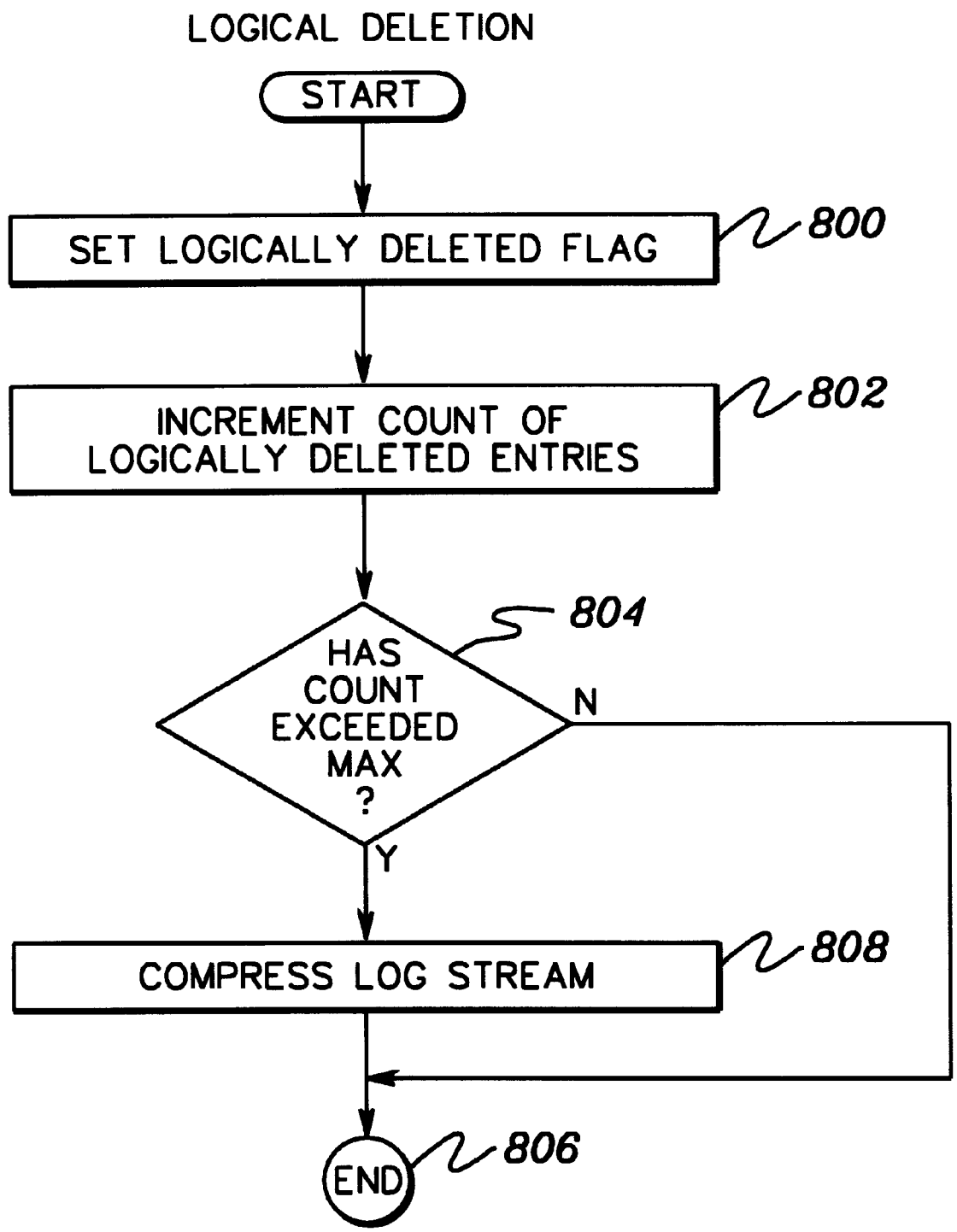
FIG. 8 depicts an embodiment of the logic used to logically delete an entry from the primary log stream of FIG. 2, in accordance with the principles of the present invention.

Referring to FIG. 8, initially, the logical deletion flag for the entry to be deleted is set in the main queue corresponding to System X, STEP 800. This flag indicates that the entry is no longer needed (i.e., it is inactive) and can be physically removed from the log stream at the appropriate time.

Subsequently, a count of logically deleted elements for System X is incremented by one, STEP 802. This count is maintained, for instance, within the storage of System X; however, it also can be maintained within the coupling facility or on external storage devices, as other examples.

Next, a determination is made as to whether the count has exceeded a predetermined maximum value, STEP 804. In one example, the maximum value is based on, for instance, a percentage (e.g., 50%) of the number of logically deleted entries within the log stream. However, the maximum value can be based on any desired relationship. Additionally, the percentage can be any desired percentage.

If the count has not exceeded its limit, then the logical deletion procedure is complete, STEP 806. However, if the count has exceeded the limit, then the primary log stream is compressed, in the manner described below, STEP 808.

One embodiment of compressing a log stream is described in detail in U.S. patent application Ser. No. 08/827,292, entitled "Tail Compression Of A Sparse Log Stream Of A Computer System," by Clark et al., (Docket No. PO9-97-019), and in U.S. patent application Ser. No. 08/827,558, now U.S. Pat. No. 5,956,735, entitled "System Of Compressing The Tail Of A Sparse Log Stream Of A Computer System," by Clark et al., both of which are filed on the same day as this application and assigned to the same assignee of this application, and each of which is hereby incorporated herein by reference in its entirety.

Figure 9:
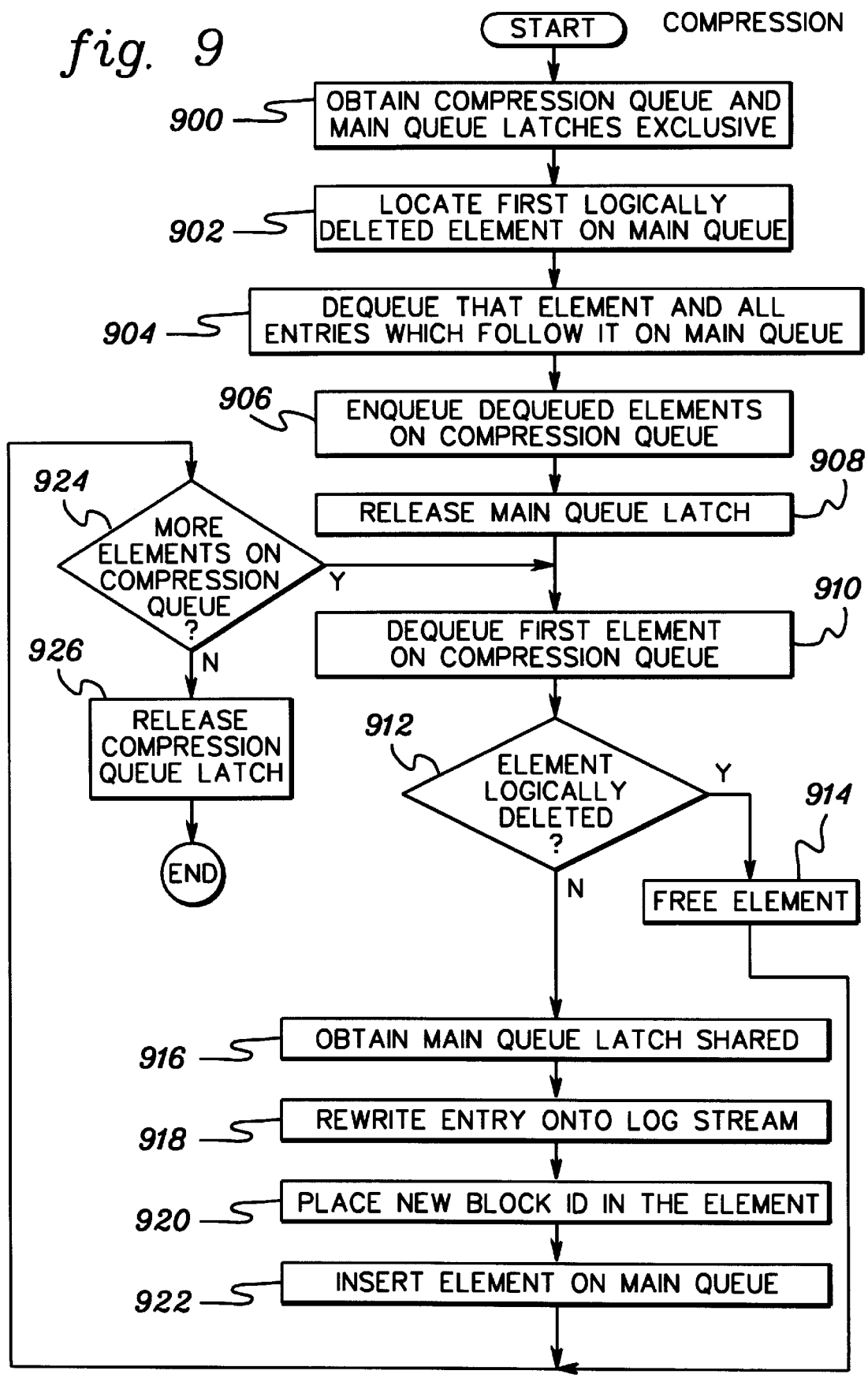
FIG. 9 depicts one embodiment of the logic used to compress the primary log stream of FIG. 2, in accordance with the principles of the present invention.

One example of compressing a log stream, by, for instance, the sync point manager of System X, is also described in detail with reference to FIG. 9. In one example, initially, the latch for the main queue of System X is obtained exclusively, as well as the latch for a compression queue, STEP 900. The exclusive latch, prevents any other entity within the system from writing to the queue, until the latch is released. The compression queue includes, in accordance with the principles of the present invention, those entries to be processed during the log stream compression, as described in detail below.

In accordance with the principles of the present invention, there is a compression queue for each system that can be connected to the log stream. Each compression queue is stored in the particular systems' storage, as one example. In another embodiment, the compression queue may be stored in a shared facility, such as the coupling facility.

Subsequent to obtaining the latches exclusive, the first element (i.e., LGB) on the main queue of System X that has been logically deleted is located, STEP 902. For example, the logical deletion flag for each element of the main queue, starting at the last element written to the queue, is checked until the element having a set flag is found.

Next, the first element on the main queue that has been logically deleted, as well as all the other entries which follow it (these entries are referred to herein as entries of a compressible set or entries within a compression zone) are dequeued from the main queue, STEP 904, and enqueued onto the compression queue, STEP 906. (The elements of the compression queue have the same format as the elements of the main queue.)

Figures 10A, 10B:
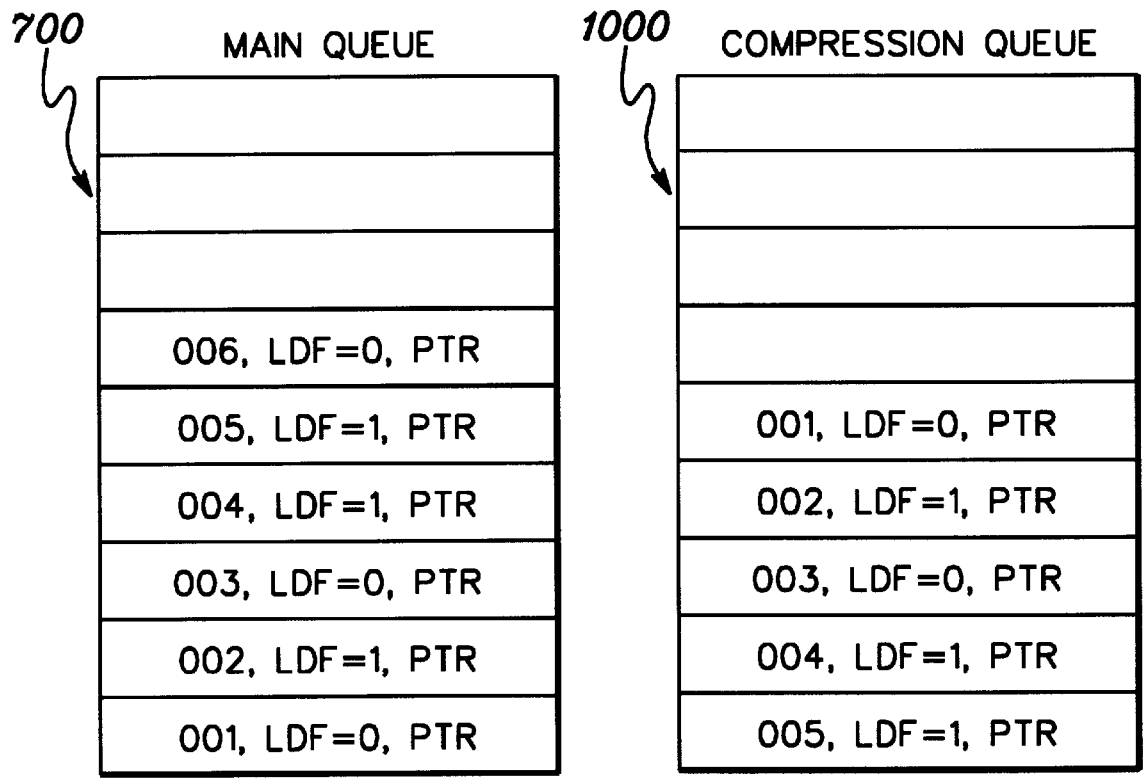
FIG. 10a depicts another example of the main queue of FIG. 7, in accordance with the principles of the present invention.
FIG. 10b depicts one example of a compression queue used in accordance with the principles of the present invention.

For example, referring to the illustrations depicted in FIGS. 10a and 10b, if the first element on main queue 700 that is logically deleted (LDF=1) corresponds to block id 005, then block id 005 is removed from the main queue and placed on a compression queue 1000 for System X, along with block ids 004–001.

Returning to FIG. 9, subsequently, the main queue latch is released, STEP 908.

Thereafter, the first element on compression queue 1000 is dequeued (e.g., block id 001), STEP 910, and a determination is made as to whether that element is logically deleted, INQUIRY 912. If the element is logically deleted (LDF=1), then that element is freed (e.g., put on a free queue for reuse by the compression technique), STEP 914.

Figure 11:
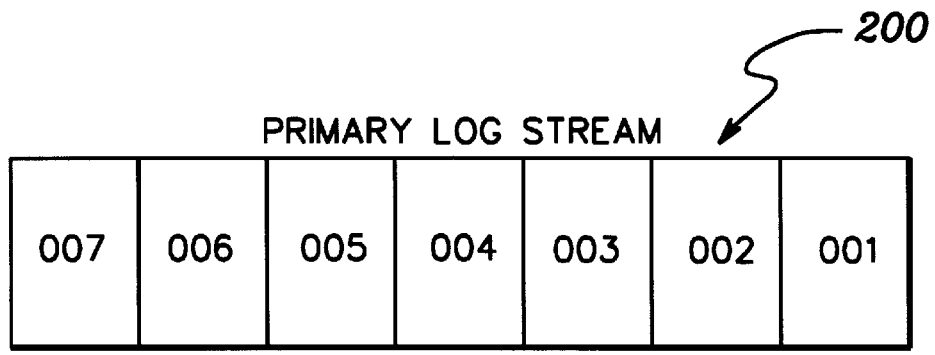
FIG. 11 depicts another example of the primary log stream of FIG. 2, in which the first entry has been rewritten as the seventh entry, in accordance with the principles of the present invention.

If, however, the element is not logically deleted (LDF=0), then the main queue latch shared is obtained, STEP 916, and the log entry corresponding to the element is rewritten on the log stream, STEP 918. For example, the log stream entry having block id 001 has not been logically deleted, in this one illustrative example (see element of FIG. 10b having block id 001), thus, the log stream entry represented by block id 001 is rewritten to another location within the log stream. In particular, in one example, a copy of the contents of block id 001 is obtained from storage (as indicated by the pointer located in the compression queue) and placed in an entry at the head of the log stream. That entry is then given a new block id (e.g., block id 007 (see FIG. 11)). When an entry is given a new block id, it is considered herein as a new entry, even though the data located in the entry may be older than the data of other entries.

Returning to FIG. 9, in addition to the above, the new block id (e.g., block id 007) is placed in an element, STEP 920, which is inserted onto the main queue in order of block id, STEP 922.

Subsequent to inserting the element on the main queue or after the element has been freed, a determination is made as to whether there are more elements on the compression queue to be processed, INQUIRY 924. If there are more elements, processing continues at STEP 910 "DEQUEUE FIRST ELEMENT ON COMPRESSION QUEUE." However, if there are no more entries to be processed, then the compression queue latch is released, STEP 926, and compression is complete.

Figure 12:
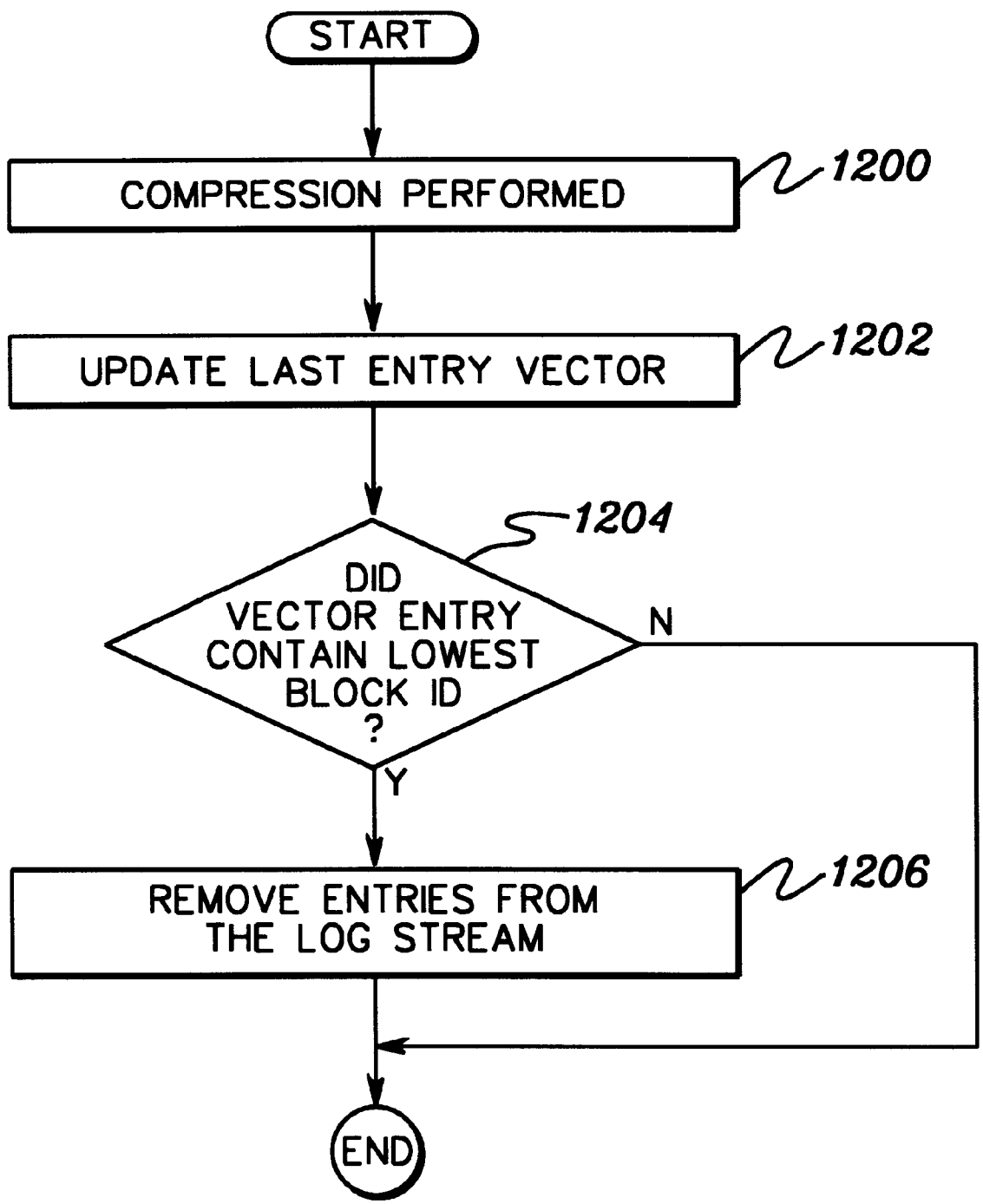
FIG. 12 depicts one embodiment of the logic used in physically removing logically deleted entries from the primary log stream of FIG. 2, in accordance with the principles of the present invention.

Now referring to FIG. 12, whenever each system performs its compression, STEP 1200, as described above, the system (e.g., System X) updates its entry in vector 500 with the block id of the oldest entry it still needs, STEP 1202. This is accomplished, in one example, by using a compare and swap protocol, which ensures that the entire vector is only changed by one system at a time. The block id to be placed in the entry is the lowest block id in main queue 700 of System X that has not been logically deleted.

After updating the vector, a determination is made as to whether the vector entry that it replaced previously contained the lowest block id of the vector, INQUIRY 1204. If it did not contain the lowest block id, then no further action is taken. However, if it did contain the lowest block id, then the sync point manager requests the system logger of System X (in this example) to delete the log tail of all the entries lower than the new lowest block id in the vector, STEP 1206.

Figure 13A:
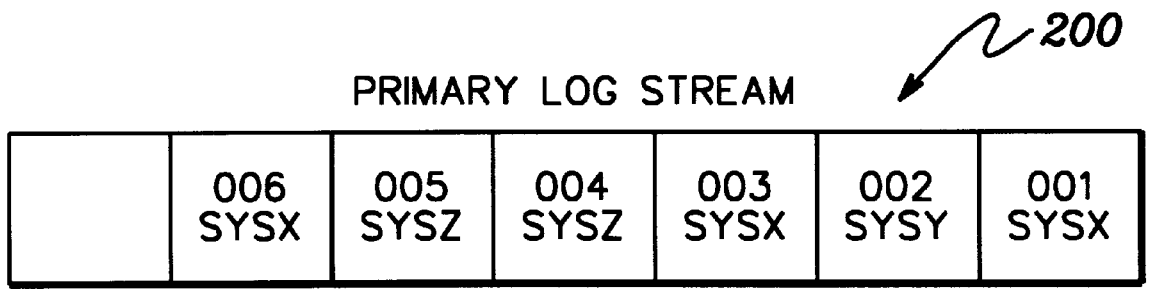
FIG. 13a depicts another example of the primary log stream of FIG. 2, in accordance with the principles of the present invention.
Figure 13B:
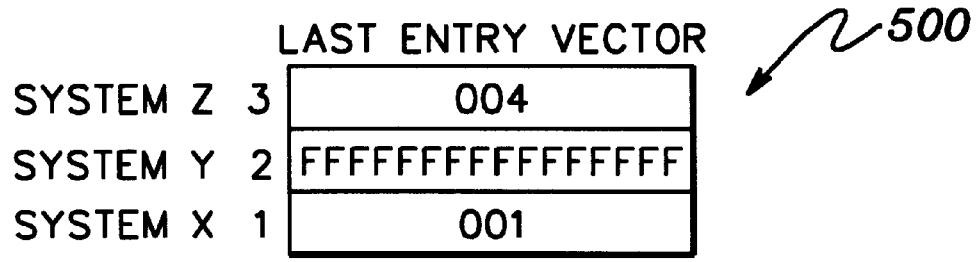
FIGS. 13b–13c depict other examples of the last entry vector of FIG. 5a, in accordance with the principles of the present invention.
Figure 13C:
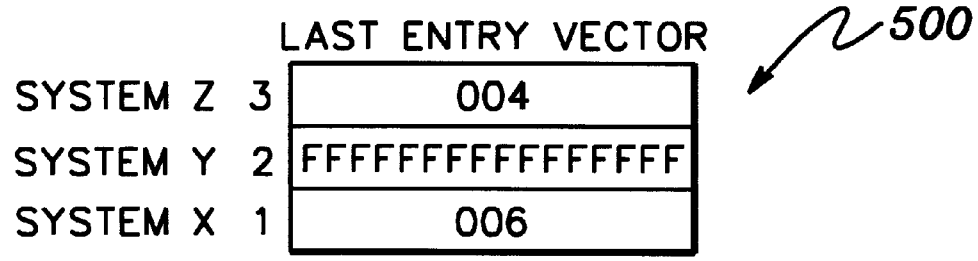

For example, assume a log stream has entries written to it by three systems, System X, System Y and System Z (see FIG. 13a). Further assume that the oldest entry which System X requires is 001; the oldest entry which System Z requires is 004; and that System Y is not active, at this time (see FIG. 13b). Then, when System X updates the vector with the oldest entry it still needs (e.g., block id 006 of FIG. 13a), as depicted in FIG. 13c, System X determines if its entry previously contained the lowest block id of the vector. In this example, the entry contained block id 001, which is the lowest. Thus, System X deletes all entries lower than the new lowest block (e.g., block id 004). That is, block ids 003–001 are physically removed from the primary log stream, and block id 004 becomes the new tail of the log stream.

The above-described compression procedure is only one example. Many variations are possible and therefore, are considered within the scope and spirit of the claimed invention. For example, in another embodiment, the compression queues are eliminated and the elements are processed directly on the main queues, similar to that described above.

In yet another embodiment, the compression queues are once again eliminated, and the elements on each main queue is processed starting at the tail of the queue (i.e., the first element on the queue (e.g., block id 001)). If that element is still needed, the data corresponding to that element is located in storage and rewritten to the head of the primary log stream, as described above. If, however, that element is not needed, then the element is freed, as described above. This processing continues up the main queue from the tail to the head, until a predefined number of unwanted entries have been freed.

In yet a further embodiment of the invention, the entries are not rewritten to the head of the same log stream, but instead to another log stream. The second log stream is also compressed in accordance with the technique of the present invention; however, in one example, it is compressed less often than the main log stream.

Described above in detail is a log compression facility that enables tail compression to be performed on a multi-system log stream. In accordance with one example of the present invention, the oldest entry required for each system is tracked and that information is used to compress the multisystem log stream.

As described above, a log stream includes one or more datum (e.g., log data). Thus, other entities that include one or more datum are included within the definition of a log stream. These entities include, but are not limited to, log files and log data sets. The invention is particularly applicable to those log streams that cannot have information within an entry deleted or changed, when the entry is not at an end of the log stream (e.g., the tail or the head). Additionally, the invention is applicable, for example, to log streams that do not include time dependent entries. Further, in one embodiment, the block ids of the log stream continue to increase over time.

The multisystem environment described above is only one example. The present invention can be used and/or incorporated within other systems or environments without departing from the spirit of the present invention. For example, different architectures and/or operating systems can be used without departing from the spirit of the present invention. As another example, one or more central processing complexes are coupled to the coupling facility, and each central processing complex includes one or more central processing units, which executes an operating system. Further, in another embodiment, the computer system can include multiple coupling facilities. Additionally, the present invention is applicable to computer systems that do not include a coupling facility.

Further, other components of the system can also have log streams associated therewith that can be managed and compressed by the present invention without departing from the spirit or scope of the present invention.

In yet a further embodiment, the system logger can be a separate component from the operating system. Further, components other than the system logger can write to and delete entries from the log stream. In yet a further embodiment, the sync point manager is not the only component that can perform the compression technique of the present invention. In another embodiment, other components of the system perform the compression technique, including, but not limited to, the resource managers. Again, the multisystem environment described herein is only one example.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of compressing a multisystem log stream of a multisystem environment, said system comprising:
    means for determining for a first system of said multisystem environment a first position within said multisystem log stream from which one or more entries of said multisystem log stream can be deleted;
    means for determining for a second system of said multisystem environment a second position within said multisystem log stream from which one or more entries of said multisystem log stream can be deleted;
    means for selecting from said first position and said second position a deletion position within said multisystem log stream; and
    means for using said deletion position to remove one or more entries from said multisystem log stream.

2. The system of claim 1, wherein said first position comprises a first block id, said first block id representing the oldest entry within said multisystem log stream that is wanted for said first system.

3. The system of claim 2, wherein said second position comprises a second block id, said second block id representing the oldest entry within said multisystem log stream that is wanted for said second system.

4. The system of claim 3, wherein said means for selecting comprises means for comparing the first block id and the second block id to determine therefrom the oldest entry to be kept within said multisystem log stream, said oldest entry corresponding to the deletion position.

5. The system of claim 4, wherein said means for using comprises means for removing said one or more entries older than said deletion position.

6. The system of claim 1, further comprising:
    means for logically deleting one or more entries owned by said first system from said multisystem log stream; and
    means for updating said first position, when said logically deleting causes a change in said first position.

7. The system of claim 1, wherein said second system is an inactive system, and said system further comprises:
    said first system being adapted to rewrite one or more entries of said multisystem log stream owned by said second system to one or more other locations; and
    means for setting said second position to reflect said rewriting.

8. The system of claim 7, wherein said one or more other locations is at or near a head of said multisystem log stream.

9. The system of claim 7, wherein at least one of said one or more other locations is within another log stream.

10. The system of claim 7, wherein said means for setting comprises means for setting said second position to a highest block id of said multisystem log stream.

11. The system of claim 1, further comprising:
    means for rewriting one or more active entries of said multisystem log stream owned by said first system to one or more other locations; and
    means for setting said first position to reflect said rewriting.

12. The system of claim 11, wherein said one or more other locations is at or near a head of said multisystem log stream.

13. The system of claim 11, wherein at least one of said one or more other locations is within another log stream.

\* \* \* \* \*